(No Model.)  J. DABLE.  5 Sheets—Sheet 1.
CORN HARVESTER.

No. 513,673.  Patented Jan. 30, 1894.

(No Model.) 5 Sheets—Sheet 2.
J. DABLE.
CORN HARVESTER.

No. 513,673. Patented Jan. 30, 1894.

Witnesses:
H. B. Hallock
W. Rosiler

Inventor:
John Dable
By A. M. Stuart
Attorney.

(No Model.) 5 Sheets—Sheet 3.

J. DABLE.
CORN HARVESTER.

No. 513,673. Patented Jan. 30, 1894.

Witnesses
H. B. Halleck
W. Rossiter

Inventor:
John Dable
By A. M. S. Crit
Attorney.

(No Model.)  J. DABLE.  5 Sheets—Sheet 4.
CORN HARVESTER.

No. 513,673.  Patented Jan. 30, 1894.

(No Model.) 5 Sheets—Sheet 5.

J. DABLE.
CORN HARVESTER.

No. 513,673. Patented Jan. 30, 1894.

Witnesses:

Inventor:
John Dable
By A. M. Stout
Attorney.

THE NATIONAL LITHOGRAPHING COMPANY,
WASHINGTON, D. C.

UNITED STATES PATENT OFFICE.

JOHN DABLE, OF CHICAGO, ILLINOIS.

CORN-HARVESTER.

SPECIFICATION forming part of Letters Patent No. 513,673, dated January 30, 1894.

Application filed February 8, 1892. Serial No. 420,759. (No model.)

*To all whom it may concern:*

Be it known that I, JOHN DABLE, a citizen of the United States, residing in Chicago, in the county of Cook and State of Illinois, have invented certain new and useful Improvements in Corn-Harvesters, of which the following is a specification.

The nature and object of my said invention is a machine adapted to be carried on wheels over a field upon which stalks of corn are standing, to guide the stalks of one row at a time into the machine as it passes over the ground, cut off the stalks, convey them back to the rear to a receptacle sufficient for the formation of a single stack, which being properly bound into a shock by the operator on the platform, is thrown upon an endless traveling bed which conveys it to the side of the machine and deposits it upon the ground, standing upright, upon its base, and out of the way of the machine, when it shall operate in the same way upon another row of stalks. One of the wheels of the carriage, when in motion, imparts the power which does the whole of the work, except that which is done by the operator in binding the shock and tipping it onto the traveling bed.

My said improvement will be hereinafter more fully described with reference to the accompanying drawings, in which—

Figure 1:
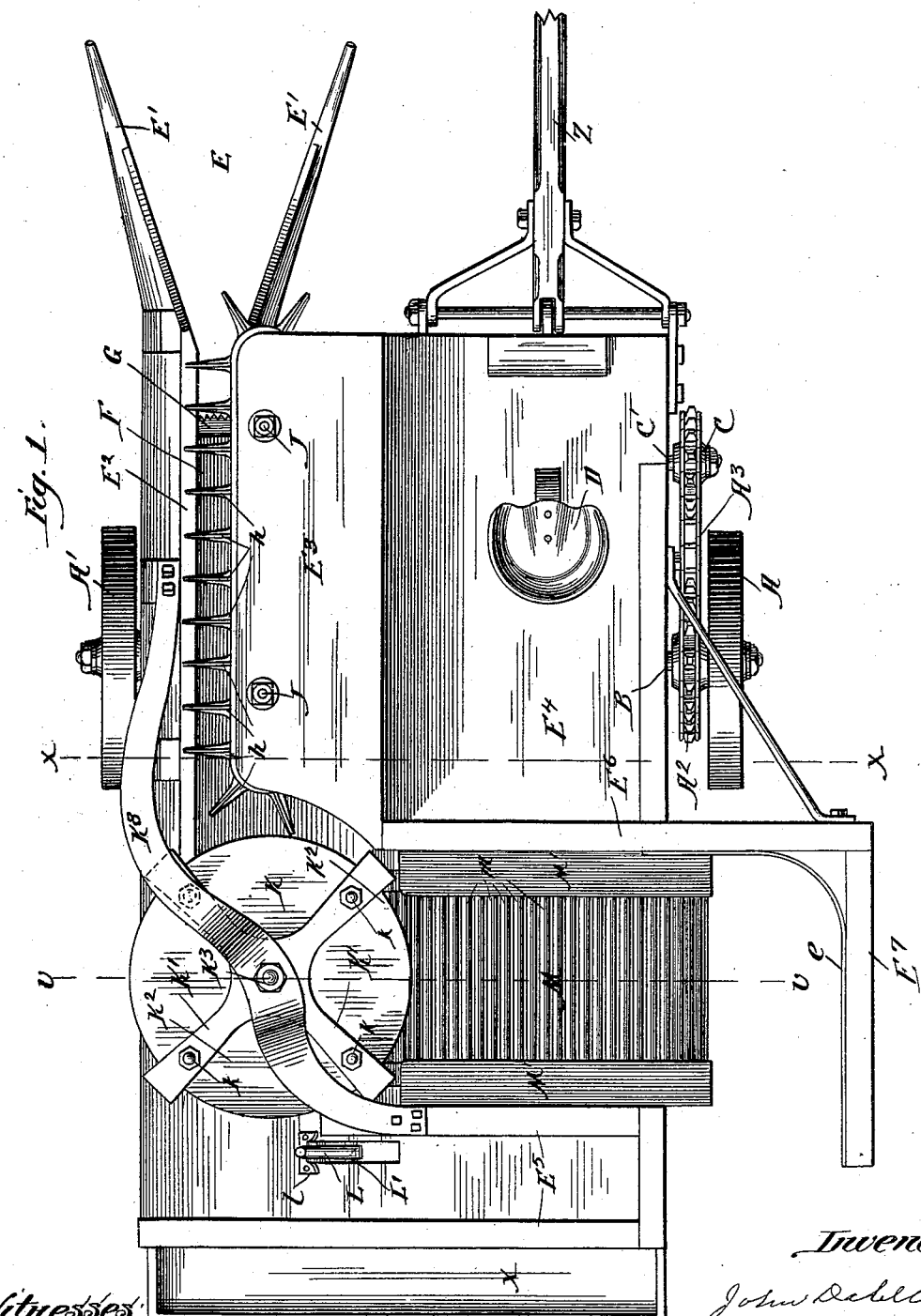
Figure 2:
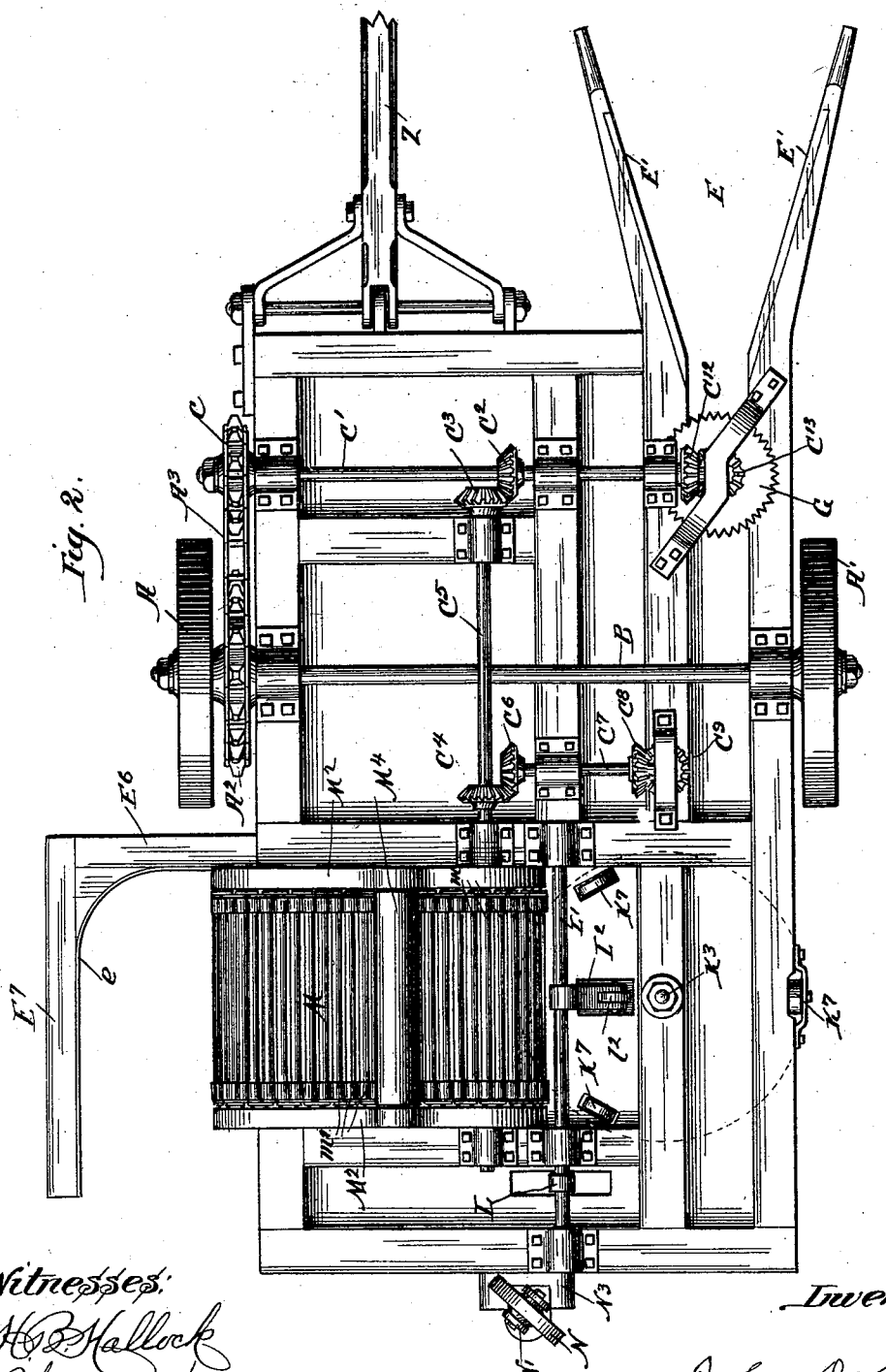
Figure 3:
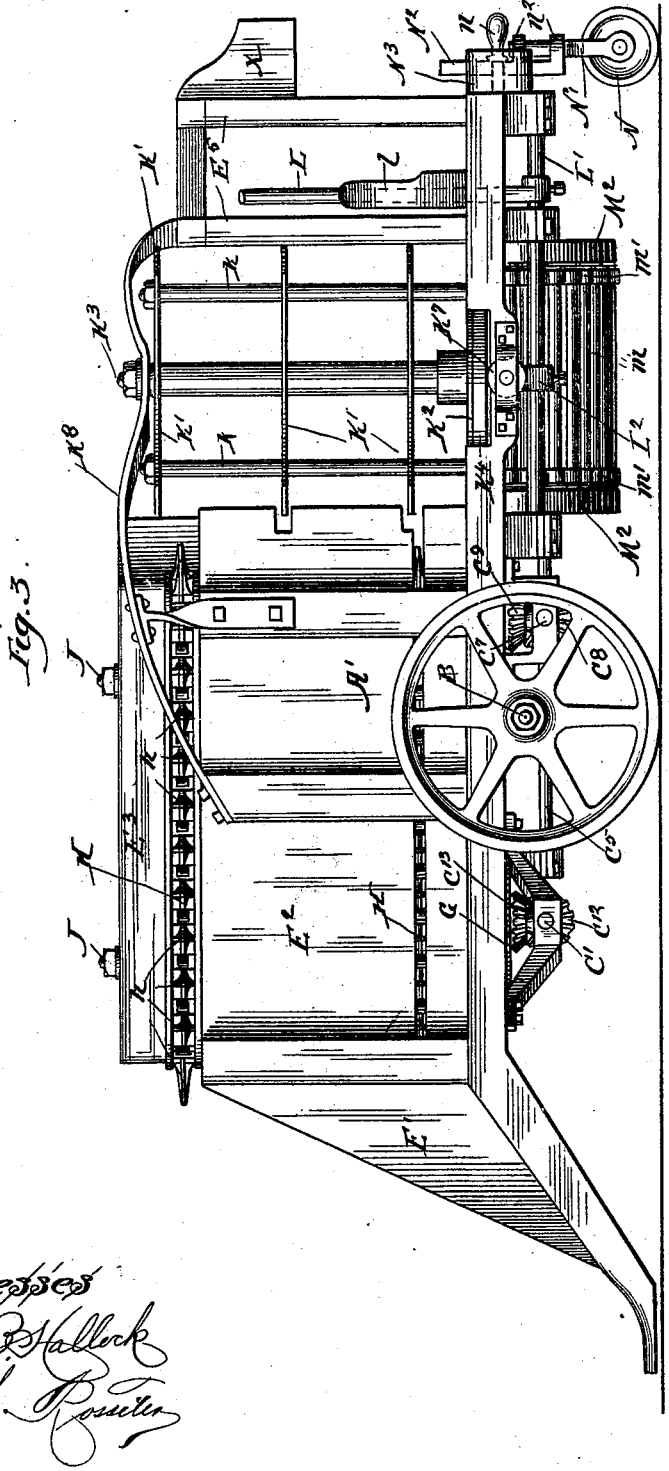
Figure 4:
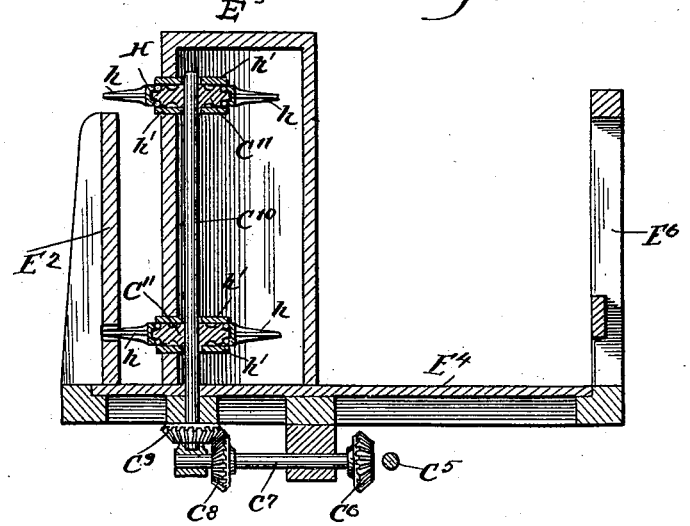
Figure 5:
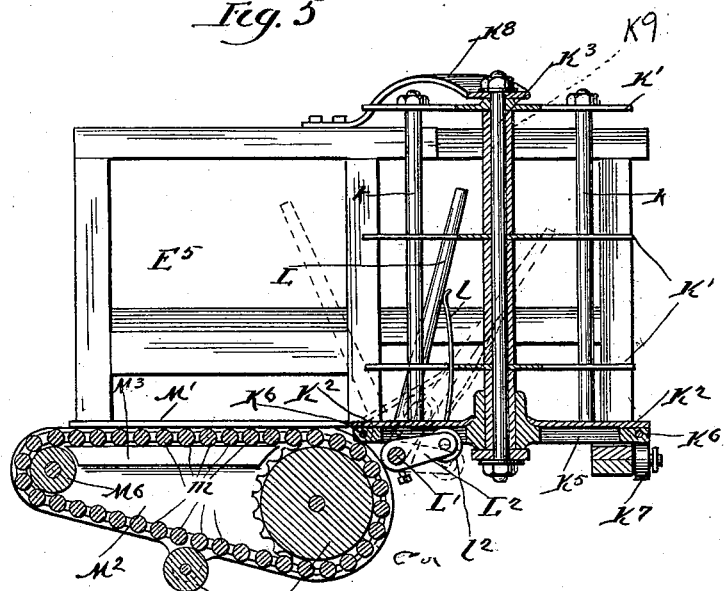
Figure 6:
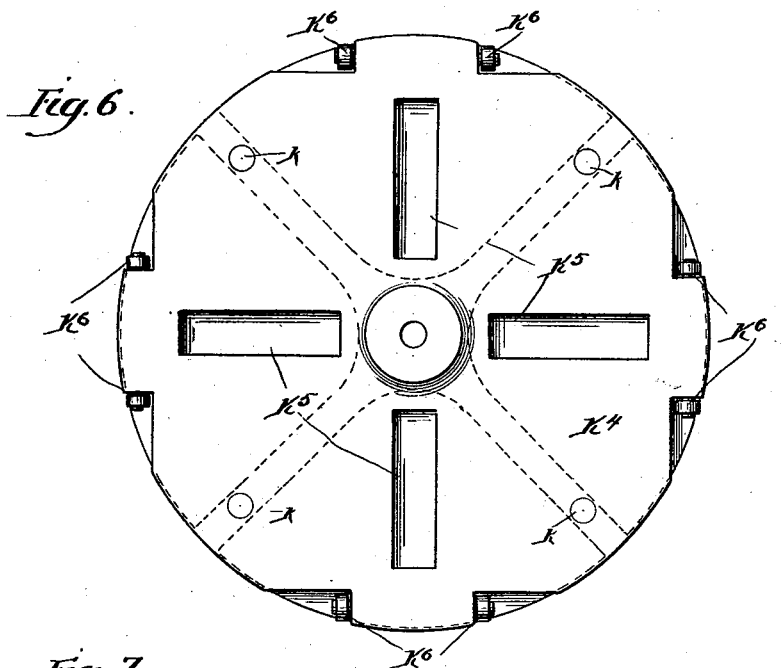
Figure 7:
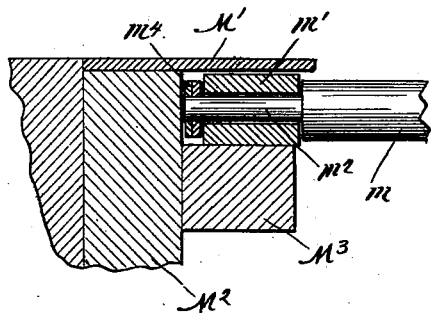
Figure 8:
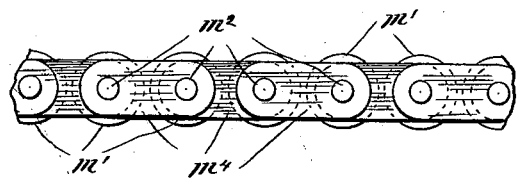
Figure 9:
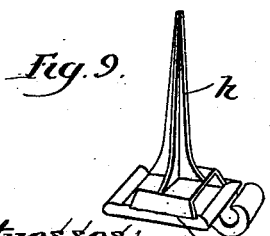
Figure 10:
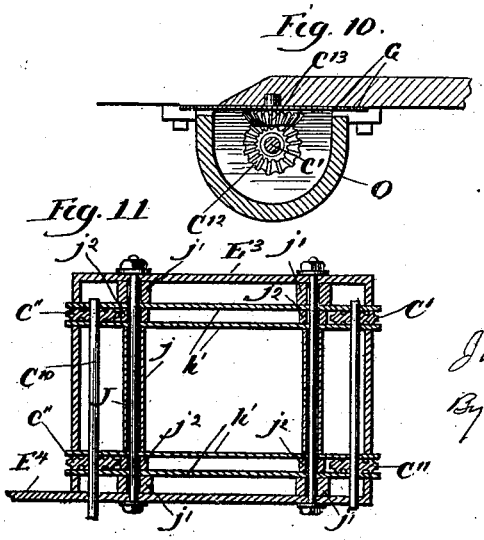

Figure 1 represents a top view of a machine embracing the same; Fig. 2 a bottom view of the same; Fig. 3 a side view; Fig. 4 a cross sectional view of a part of the same, taken as indicated by the broken line X X in Fig. 1; Fig. 5 a like section taken as indicated by the broken line U U in Fig 1; Fig. 6 a detail view of the receptacle for the stalks of corn after they are severed and carried back to it; Fig. 7 a like view, partly in section, of one of the rollers $m$ of the endless traveling bed, the antifriction thimbles on each end of the said rollers and the chains connecting said rollers together. Fig. 8 is a side view of a portion of one such chain showing the ends $m$ of the journals of said rollers, and by broken lines showing the antifriction thimbles mounted upon them and a side view of said chain; Fig. 9 a detail view of link H of the sprocket chain with its tooth $h$; Fig. 10 a like view, in vertical section of the box O inclosing the saw or cutter G., and the bevel gears by means of which the saw is operated; and Fig. 11 a detail view in vertical section of the special frame including posts and shafts for carrying the cut up corn back to the receptacle before mentioned.

In the drawings A A' indicate the carrying wheels of the machine; B the axle.

N is a caster wheel mounted at the rear of the machine to enable it to be easily turned around in operation. The axle on which it turns has its bearings in the vertical shaft N' which passes up through a suitable holder $N^2$ which itself is supported by a projection $N^3$ of the main frame of the machine and allows the shaft N' to turn therein, and $n^2$ is merely a loop attached to the main frame and holds the upper end of the shaft steady and allows it to turn therein, and $n$ is a pin adapted to be inserted in any one of a vertical series of holes in the holder and also in the projection of the frame by means of which the holder and caster wheel may be held up after being adjusted to any desired elevation to correspond with the forward portion of the machine. But as no claim is made for this caster wheel no further description is deemed necessary.

Upon the axle are supported the frame and platform, which are oblong in form. The right hand wheel is provided with a hub extending inwardly and has mounted upon it a sprocket wheel $A^2$ and then across and under the frame forward of the axle the shaft C' is furnished with proper bearings and on its right hand end is mounted a sprocket wheel C and over and around this wheel and the like one on the hub of wheel A is the open link chain $A^3$ and thus when the carriage moves forward these devices impart motion to the shaft C' which last named shaft conveys motion to all the other movable parts except the receptacle for the cut up corn stalks before mentioned. Upon the shaft C' about midway its length is mounted a bevel gear $C^2$ and in like manner is mounted upon suitable bearings in the frame the shaft $C^5$ at a right angle with shaft C' and it is provided with bevel gear $C^3$ at its forward end adapted to mesh with gear $C^2$, and further back to the rear it is furnished with another bevel gear $C^4$ which meshes with a like gear $C^6$ on the end of short cross shaft $C^7$ which is also furnished with proper bearings under and against the frame, while the other end of that shaft is provided with bevel gear $C^8$ which is adapted to mesh with bevel gear $C^9$ on the lower end of shaft $C^{10}$ which latter named shaft imparts the motion that carries back the cut up corn stalks to where they are bound into shocks by the operator. I will here, however, revert to shaft $C'$, and state that it is provided on its right hand end with a bevel gear $C^{12}$ which meshes with another bevel gear $C^{13}$ which is mounted upon a short vertical shaft on which latter shaft is mounted the circular saw G which is thus made to revolve horizontally, and which is designed to cut off the stalks of a single row of them as the machine is driven against them, and the fingers E' E' are designed to guide them into the space E and against the saw G. In Fig. 2 of the drawings the saw is shown to be protected by a metal strap merely, but I much prefer protecting the bevel gears $C^{12}$ and $C^{13}$ and the saw G by the box O shown in Fig. 10. It is bolted to the under side of the frame as shown in that figure and performs an important function in the protection of the parts named from dust, weeds, and corn blades, which would otherwise obstruct and perhaps break them. The box may be cast of iron in one piece or otherwise, and made quite strong, and it will prove quite useful also in breaking down the stumps of the cut stalks and leave the ground in better condition for plowing. The short shaft shown and bearing the saw G and the bevel gear $C^{13}$ is journaled in the frame as shown in Fig. 10.

Figure 11:
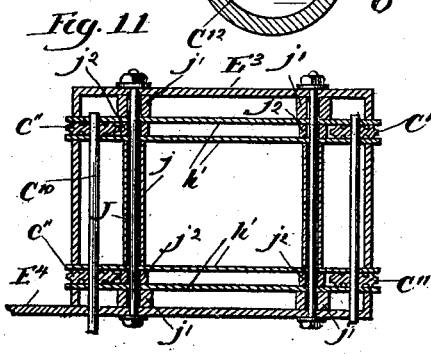

My devices for conveying the cut up corn stalks, in an upright position, back to the receptacle or shocking table, consist of an inclosing box or case, and the side board $E^2$ standing on the floor or platform $E^4$, and it forms one side of the passage way F for the stalks from the front to the rear where they are deposited with their butt ends upon the shocking table before mentioned, and two other vertical boards or walls, which extend up from floor $E^4$ one of which is marked $E^5$ and the other stands between it and the side piece $E^2$ and a sufficient distance from the latter to leave a sufficient passage way for the corn stalks to pass back between the two vertical walls described with a proper top $E^3$ on their upper ends as shown in Fig. 4 in which also is shown the right hand wall of the frame of the machine which serves as a guard for the interior. The left hand wall is pierced above and below to allow portions of the sprocket wheels $C^{11}$ mounted upon shaft $C^{10}$ to pass through it as shown in Fig. 4. The described box incloses the following parts, namely: two pairs of metal plates $h'$, one pair near the top of the box or case, the other near its bottom, and both pairs of plates and the top and bottom of the case are pierced by the posts J J, while the shaft $C^{10}$ passes up from below through the bottom and through the two pairs of plates and the sprocket wheels between each two of a pair as shown. The idle shaft shown passes through each pair and through the two sprocket wheels $C^{11}$ mounted upon said shaft. The two posts J are held firmly against the top and bottom by screw nuts upon their respective ends as shown in Fig. 11, and in order to keep the plates parallel with each other and secure true action of the sprocket wheels between each pair pipe sections $j'$ $j'$ are placed on the posts between the upper pair and the top and the lower pair and the bottom and other like sections $j^2 j^2$ between the two plates constituting each pair and other sections $j j$ between the upper and lower pair and thus the operative parts are firmly held to true action. The open linked chain adapted to carry back the cut up stalks is composed of links H which have a like hook at each end to engage with adjoining links and each alternate link is provided with a long tooth $h$ to extend across the passageway F and carry the stalks back when the chain moves. The sprocket wheels $C^{11}$ are fixed upon the shaft $C^{10}$ so far apart that the teeth $h$ on the lower chain will engage with the stalks near their butts and those on the upper chain with them above the middle. The teeth may be cast of any suitable metal in one piece with the links to which they belong or otherwise.

The receptacle before mentioned is composed of the base plate as shown in Fig. 6 and it is provided with four slots $K^5$ through it, and also with four tripping plates $K^4$, which are hinged to it as shown in that figure, the hinges $K^6$ being opposite the outer end of each slot. The hinges $K^6$ consist each of two eyes furnished by the base plate and a rod attached to the tripping plates and having its ends in the eyes and adapted to turn therein. See Figs. 5 and 6. Then up through the center of the plate is a vertical rod $K^3$ which is provided with a bearing for its upper end in the fender bar $K^8$ which has the peculiar curved form shown in Figs. 1 and 3 and is designed, while the stalks are being carried back, to keep them in proper place and out of the way of the moving parts. The rod $K^3$ passes down through the floor and is secured at each end by screw nuts and turns freely in its bearings. On it is mounted a revolving frame which consists of a hollow shaft $K^9$ which is shown in vertical section in Fig. 5 and which is provided with a series of plates each of which extends out radially and horizontally, so that when the frame revolves upon the vertical rod $K^3$ there will be presented to the conveying apparatus, in succession, the arms, one above and one below and another between them, for the reception of the stalks. The outer ends of the arms are stiffened and held in proper position by the rods $k$.

The operator may stand anywhere on the platform in the space $E^5$, and as one division of the revolving frame becomes full he will remove the stalks, enough in quantity for one shock, turn the frame a quarter round, bind the shock while another division is being filled and so on, but to remove the shock after it has been bound the tripping plates before mentioned have been provided, and when these are in their normal position they fit down snugly upon the base plate and the butt ends of the stalks stand upright upon them. But in order to make their removal easy the tripping plates are hinged as hereinbefore stated. The base plate is furnished with friction rollers $K^7$ as shown in Figs. 2 and 5, the base plate furnishing the bearings for the rollers which roll upon the floor of the machine. Upon a special shaft $L'$ is fastened a lever L and to the same shaft is fastened the crank arm $L^2$, and so when stalks enough are on the tripping plate the operator pushes or pulls the lever until it occupies the position shown by the broken lines in Fig. 5, and the free end of the crank arm will have been forced up through one of the slots $K^5$ in the base plate and will have raised the tripping plate on its hinges into the position shown by the broken lines in Fig. 5 and by that act the shock will have been slid off onto the traveling bed M in a manner so easy as not to upset it. $l$ is merely a spring stop to prevent the lever from going back too far.

The traveling bed M is kept in motion so long as the carriage is driven and it is made up of a series of wooden rollers $m$ which are mounted upon metal rods $m^2$ which rods are provided near each end with antifriction rollers $m'$, and these devices are connected together by simple flat links $m^4$ each one of which has a hole through each of its ends as shown in Fig. 8. The end of each rod $m^2$ is inserted through the hole in the forward end of a link and through the back end of another link, and thus an endless bed is formed of these wooden rollers $m$, and in order to cause this endless bed to travel a sprocket wheel $M^5$ with projections upon its periphery adapted to enter the spaces between adjoining rollers $m$ having the thimbles $m'$ on their ends is fastened upon the rear end of shaft $C^5$ and there at a sufficient distance from shaft $C^5$ another small shaft $M^6$ is mounted upon the frame and provided with an idle roller in order that when the endless bed embraces this and the sprocket wheel $M^5$, the endless bed will be held taut. Thereupon the endless bed moves and the shocks of corn stalks are successively delivered upon it by the tripping plates. They are conveyed to the outer edge of the machine and dropped upon the ground.

In the drawings Z indicates a portion of the tongue of the carriage, $E^6$ a cross beam of the frame and $E^7$ a long bar at a right angle thereto designed to protect the shocks as they are delivered against going too far away as they reach the ground and $e$ is intended to hold the long bar and beam at a right angle with each other and is merely an iron strap fastened to both.

$M^4$ shown in section in Fig. 5 is a loose roller mounted upon a rod having its bearings in the frame, and is designed to extend across under the traveling bed and prevent the same from sagging when the machine is operating.

D indicates the seat for the driver.

X is merely a box to hold the necessary tools for the use of the operator.

What I claim as my invention, and desire to secure by Letters Patent, is—

1. In combination with the described box or case the operative parts inclosed therein, namely, the two pairs of plates $h'$, the two pairs of sprocket wheels $C^{11}$, the shaft $C^{10}$ and the idle shaft described upon which the two sprocket wheels are mounted, the pipe sections $j, j', j^2$ and the two described sprocket chains, the whole adapted to secure true action and feed the cut-up stalks and convey them back to the shocking table, substantially as described.

2. In combination with the described revolving frame for the reception of successive parcels of stalks, the described base plate provided with slots $K^5$ through the same, and also with tripping plate $K^4$ hinged thereto directly over said slots, and the lever L, with its shaft $L'$ and crank arm $L^2$, the whole adapted to raise the inner ends of the tripping plates and cast the shocks of stalks off upon the traveling bed when required, substantially as described.

3. In combination with the shaft $C^5$ and the sprocket wheel $M^5$ mounted thereon, and the idle wheel $M^6$, the traveling bed M composed of rollers $m$ provided with friction thimbles $m'$, and with spindles $m^2$ on which they turn, and the endless chain connecting the rollers together composed of flat links $m^4$ connected with spindles $m^2$ as described, the whole adapted to be set in motion by the carriage and to carry off the shocks of stalks when thrown onto the bed and deliver them upon the ground standing upright, substantially as described.

JOHN DABLE.

Witnesses:
C. HUGE,
HORACE WHEELER.